United States Patent [19]

Stanwick et al.

[11] 4,051,399
[45] Sept. 27, 1977

[54] DYNAMOELECTRIC MACHINE INCLUDING GAS BAFFLES

[75] Inventors: Casmer P. Stanwick; Lawrence E. Jordan, both of Amsterdam, N.Y.

[73] Assignee: General Electric Company, Schenectady, N.Y.

[21] Appl. No.: 696,908

[22] Filed: June 17, 1976

[51] Int. Cl.² ............................................. H02K 5/24
[52] U.S. Cl. ...................................... 310/51; 310/57; 310/258
[58] Field of Search ................. 310/51, 258, 52, 54, 310/55, 57, 58, 59, 60, 62, 63, 64, 65, 254; 181/33 A, 33 K; 336/100

[56] References Cited

U.S. PATENT DOCUMENTS

| | | | |
|---|---|---|---|
| 2,920,218 | 1/1960 | Beckwith | 310/55 |
| 3,462,624 | 8/1969 | Darrieus | 310/51 |
| 3,531,667 | 9/1970 | Barton | 310/51 |
| 3,708,707 | 1/1973 | Kranz | 310/258 |
| 3,739,208 | 6/1973 | Shartrand | 310/58 |

*Primary Examiner*—R. Skudy
*Attorney, Agent, or Firm*—John F. Ahern; James W. Mitchell

[57] ABSTRACT

A dynamoelectric machine including a stator core mounted on keybars. The keybars are in turn supported on spring bars which are fastened to the frame of the machine. The mounting arrangement permits relative movement between the core and the frame and between the keybars and the adjacent spring bars so as to minimize transmission of vibration from the core to the frame. The core is cooled by causing gas under pressure to be forced radially inwardly through first passages in the stator core and radially outwardly through second passages in the core, these first and second passages alternating along the length of the stator. In order to prevent leakage of cooling gas between the inflowing gas stream and the outflowing gas stream which would otherwise reduce the amount of cooling gas flowing through the aforementioned stator core passages, a plurality of baffles are positioned on the spring bars in regions where such leakage might otherwise occur. Each baffle is of generally U-shape and includes two legs engaging opposite sides of the spring bar with which it is associated and an intermediate leg positioned between the stator core and the spring bar for blocking leakage of gas through the space between the stator core and the spring bar. One of the first mentioned legs is positioned between the spring bar and adjacent keybar and prevents leakage of gas through the space between the spring bar and the keybar.

7 Claims, 8 Drawing Figures

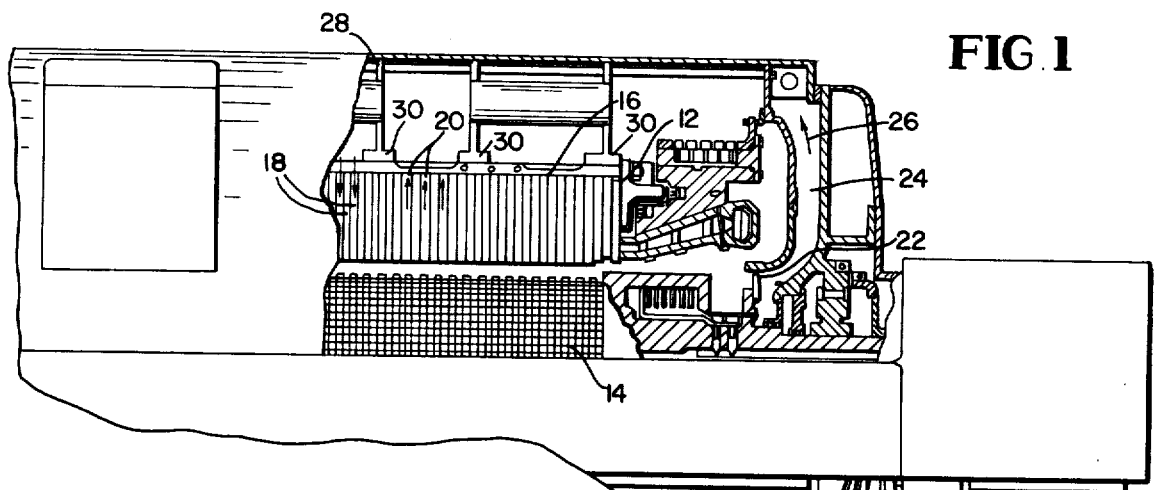
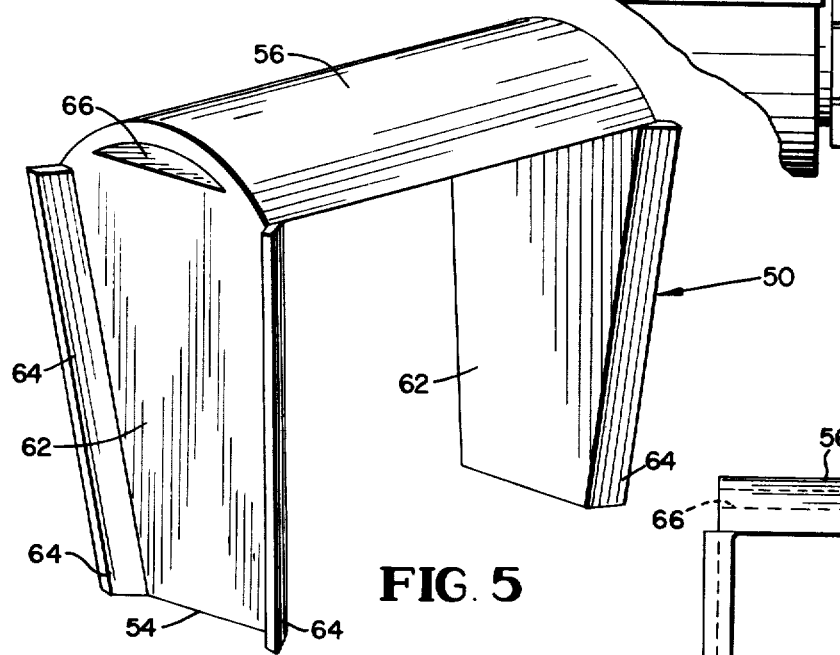
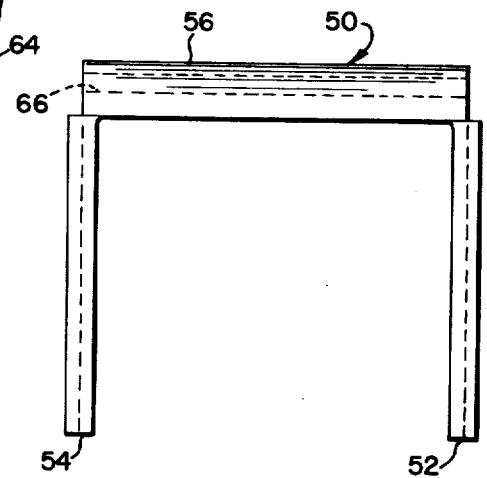
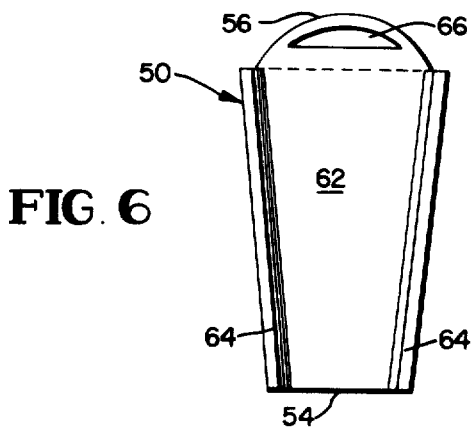
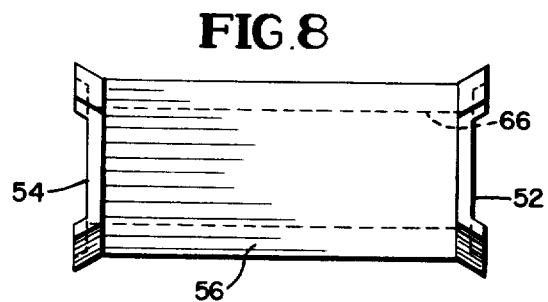

DYNAMOELECTRIC MACHINE INCLUDING GAS BAFFLES

BACKGROUND OF THE INVENTION

1. Field of the Invention

This invention relates to dynoamoelectric machines and, more particularly, to arrangements for insuring effective flow of cooling gas reverse flow dynamoelectric machines.

2. Description of Prior Art

In reverse flow cooled dynamoelectric machines, in particular, there is a need to remove a substantial amount of heat, particularly from large generators, while simultaneously preventing vibrations from being transmitted from the core of such a machine to the frame thereof. A presently employed structure utilizes a keybar and spring bar construction to space the core from the frame so as to reduce transmission of core vibrations to the frame. This arrangement provides a space between the core and the frame and a space between the keybars and spring bars which allow relative movement and reduce vibration transmission. However, these spaces also provide an unrestricted path for gas to flow between inlet and outlet passages without passing through the core of the machine and, hence, no heat is removed from the core by this gas. The fan of the dynamoelectric machine must still pump this gas, and this wasted effort is reflected in reduced machine efficiency.

By the arrangement of this invention, transmission of vibration from the stator core to the frame is still minimized while gas leakage adversely affecting the cooling of the core is eliminated.

Accordingly, it is an object of this invention to provide an improved reverse flow cooled dynamoelectric machine which is constructed so as to prevent undesired gas leakage between inlet and outlet passages and also to minimize transmission of core vibrations to the frame of the dynamoelectric machine.

It is another object of the invention to provide a reverse flow cooled dynamoelectric machine which includes a baffle arrangement for effectively sealing against undesired flow of cooling gas.

DESCRIPTION OF THE DRAWINGS

The invention may be better understood by reference to the drawings in which:

FIG. 1 is an elevation view, partly in section, showing the general structure of a dynamoelectric machine incorporating this invention.

FIG. 5 is a perspective view showing details of the baffle structure employed in this invention.

FIG. 6 is an end view of the baffle shown in FIG. 5.

FIG. 7 is a front elevation view of this baffle, and

FIG. 8 is a bottom view of the baffle.

SUMMARY OF THE INVENTION

Figure 2:
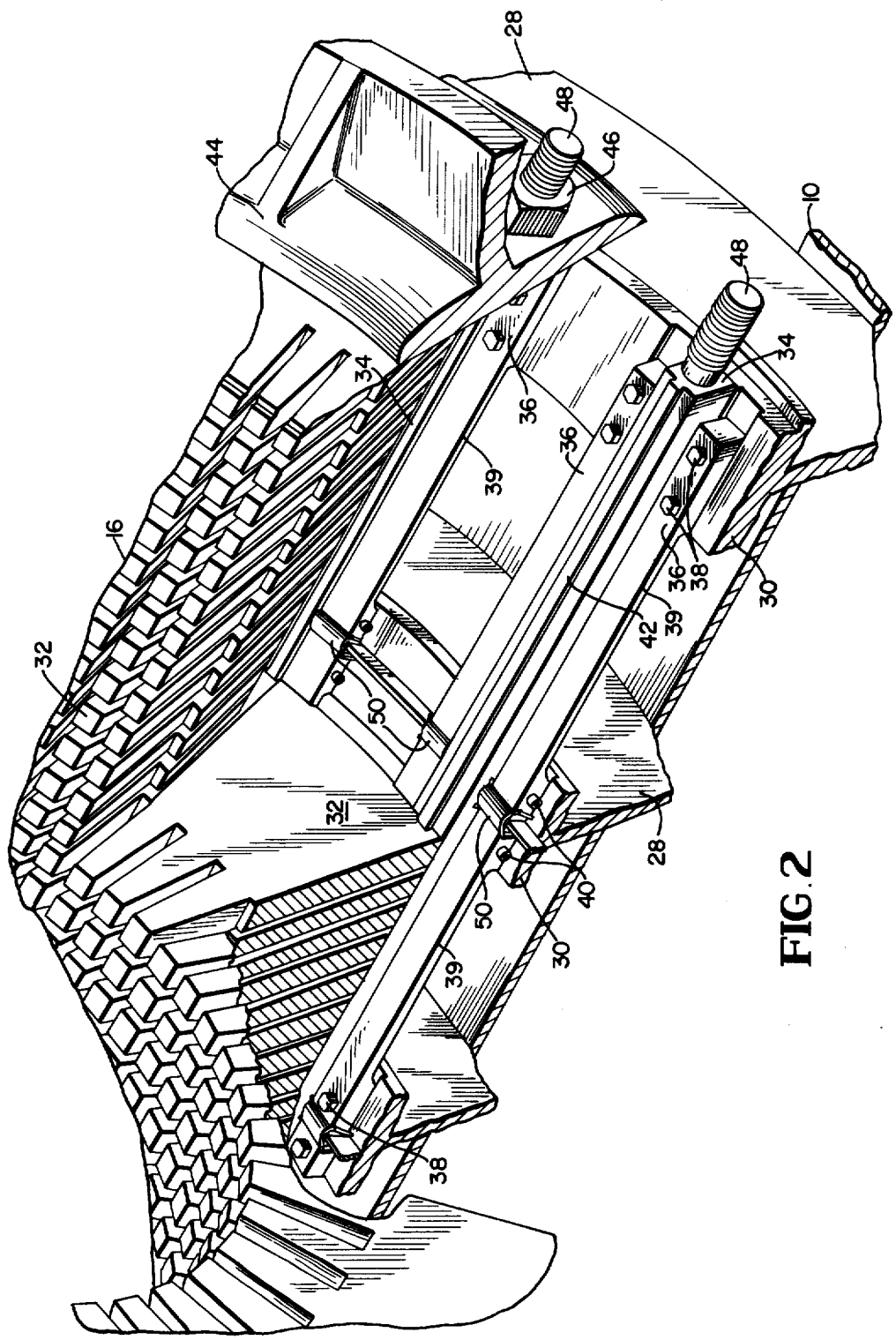
FIG. 2 is a perspective view, partly in section, with portions removed for clarity, of a portion of the core of a dynamoelectric machine showing the core mounting arrangement and also showing the baffle structure of this invention for insuring effective flow of cooling gas.

In the dynamoelectric machine of this invention a stator core is mounted on keybars. The keybars are in turn supported on spring bars which are fastened to the frame of the machine. The mounting arrangement permits relative movement between the core and the frame and between the keybars and the adjacent spring bars so as to minimize transmission of vibration from the core to the frame. The core is cooled by causing gas under pressure to be forced radially inwardly through first passages in the stator core and radially outwardly through second passages in the core, these first and second passages alternating along the length of the stator. In order to prevent leakage of cooling gas between the inflowing gas stream and the outflowing gas stream which would otherwise reduce the amount of cooling gas flowing through the aforementioned stator core passages, a plurality of baffles are positioned on the spring bars in regions where such leakage might otherwise occur. Each baffle is of generally U-shape and includes two legs engaging opposite sides of the spring bar with which it is associated and an intermediate leg positioned between the stator core and the spring bar for blocking leakage of gas through the space between the stator core and the spring bar. One of the first mentioned legs is positioned between the spring bar and adjacent keybar and prevents leakage of gas through the space between the spring bar and the keybar.

DESCRIPTION OF THE PREFERRED EMBODIMENT

Referring now to FIG. 1 of the drawings, there is shown a general representation of a dynamoelectric machine, specifically a generator, including the baffle construction of this invention. The generator includes an outer wall or casing 10 within which is mounted a stator 12 and a rotor 14. The stator 12 includes a core 16 which is formed in a conventional manner from a plurality of laminations. The core 16 is further formed to include, between the laminations, passages indicated generally at 18 for flow of cooling gas inwardly to a center of the core and passages indicated generally at 20 for flow of cooling gas outwardly from the center of the stator core. The cooling gas is caused to flow in this manner by a fan 22 mounted on the rotor and positioned to cause a flow of cooling gas through a duct 24 in the direction indicated by the arrow 26.

The cooling system employed is of the type called reverse flow cooling wherein the cooling gas is circulated by the fan in the direction shown in FIG. 1. Since the cooling system itself is not part of the present invention, details of the coolers employed and of the duct system for effecting flow of cooling gas through the aforementioned stator core passages has been omitted for clarity and the physical structure of the passages themselves have not been shown in detail. For details of a suitable cooling system, including details of the structural arrangement of the passages themselves, reference may be made to U.S. Pat. No. 3,739,208, Shartrand, which is assigned to the assignee of the present invention. The Shartrand patent is incorporated in this application by reference. While in the portion of the generator shown in FIG. 1, only a single group of passages for inward flow of cooling gas have been indicated and only a single group of passages for outward flow of cooling gas have been indicated, it will be apparent from the Shartrand patent that a plurality of such passages are employed in an alternating arrangement along the length of the stator. The additional passages have not been indicated in FIG. 1 because a single group of passages for inflow and a single group of passages for outflow of cooling gas are sufficient for describing the present invention.

The stator core is supported on the casing 10 by a frame which includes a plurality of section plates 28 each of which is fixed at its outer end to the casing and includes at its inner end a frame member 30 which may be an arcuate section or a complete circular member.

Turning now to FIG. 2, it can be seen that the stator core 16 is formed from a plurality of core sections 32, each of which comprises a plurality of laminations. In order to mount the core and the core sections thereof on the frame in a manner which minimizes transmission of vibration from the stator core to the frame and the casing 10, a plurality of circumferentially spaced keybars 34 and spring bars 36 are employed. The keybars, two of which are shown in FIG. 2, are circumferentially spaced about the frame members 30. Each of the keybars is in turn supported on spring bars positioned on each side of a corresponding one of the keybars 34. The spring bars are mounted by means of bolts 38 on alternate ones of the frame members 30. The spring bars are formed, as shown in FIG. 2, with portions 39 of reduced cross-section between adjacent frame members 30 to provide appropriate flexibility for these spring bars. The spring bars 36 are conncted to the adjacent keybar by means of bolts 40 at a position midway between the locations where the spring bar is connected to frame members 30, this position being in line with a frame member intermediate the frame members to which the bolts 38 are connected. The spring bars support the adjacent keybar by means of the bolts 40 in spaced relationship to the frame members 30 so that there is no direct path for transmission vibration from the stator core through the keybars to the frame.

Each of the keybars 34, as shown in FIG. 2, includes on its radially inner surface a key 42 and the laminations forming a core section are correspondingly formed so as to dovetail with the key 42 for retaining the core section in assembled position on the keybar.

The stator structure is completed by end flanges, one of which is shown at 44, which are mounted on the keybars by means of nuts, one of which is shown at 46, which engage threaded portion 48 extending from each keybar.

The structure thus far described provides for effective isolation of the stator core from the frame so as to minimize transmission of vibration from the core to the frame. However, this effective vibration isolation is accomplished in part because the construction thus far described, which does not form a part of the applicants' invention, causes the spring bars to be spaced from the radially outward portion of the stator core. Because of this, cooling gas intended to flow through first passages 18 inwardly through the stator core and through second passages 20 outwardly through the stator core may in part leak, in the region between the first and second passages, through the space between the stator core and the spring bars. As viewed in FIG. 1, this region between the first and second passages where such leakage could occur would be in the general region of a frame member 30. Thus, a portion of the cooling gas is bypassed directly from the inflowing gas stream to the outflowing gas stream without passing through the stator core and hence without contributing to the cooling of that core. Such loss of cooling effectiveness, of course, causes an increase in the temperature of the stator core and limits the capacity of the machine and the efficiency of the machine.

This leakage becomes of particular importance in dynamoelectric machines employing reverse flow cooling because of the substantially higher pressures employed in such reverse flow cooling. Thus, the greater differential in pressure between the inflowing gas stream and the outflowing gas stream causes a greater pressure drop across the potential leakage path and hence an increase in leakage and an increase in the diversion of effective cooling capacity.

Figure 3:
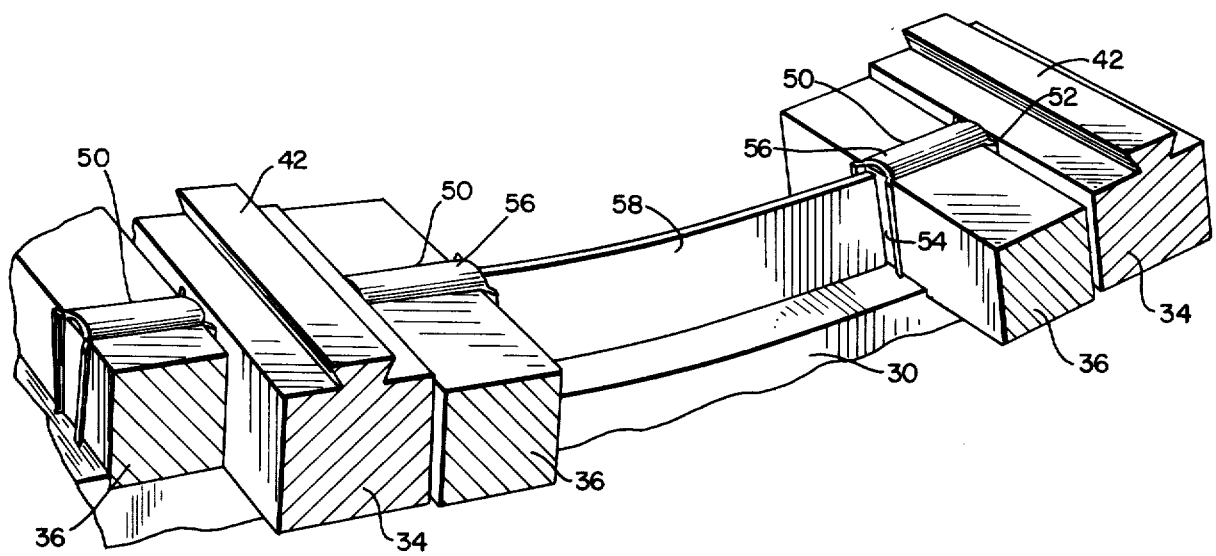
FIG. 3 is an enlarged sectional view of a portion of the structure illustrated in FIG. 2 showing the baffle construction of this invention in more detail.
Figure 4:
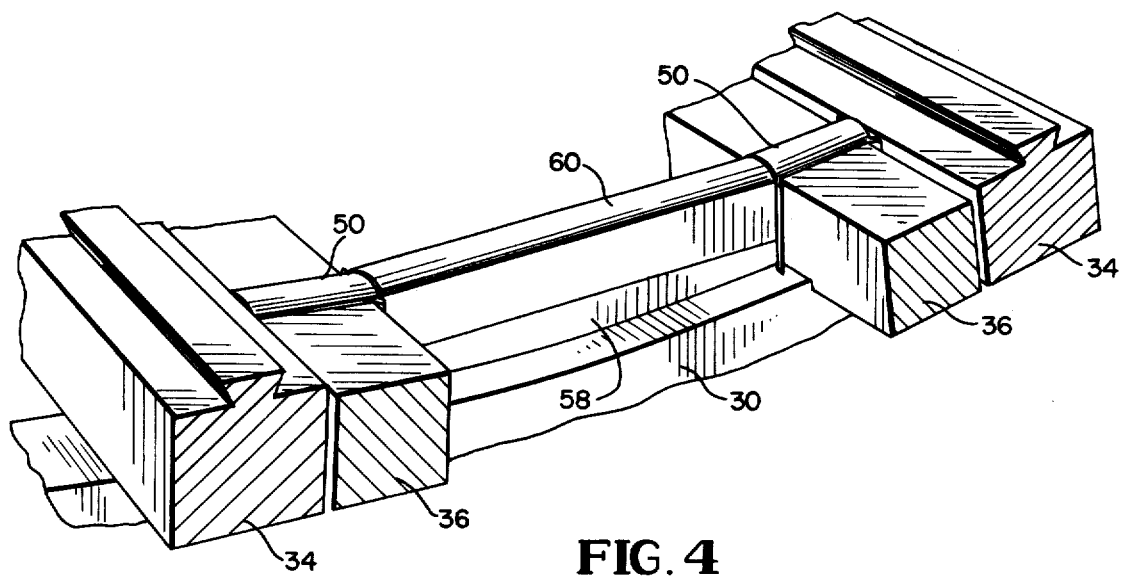
FIG. 4 is a view similar to that in FIG. 3 showing an additional baffle element.

In accordance with the present invention, such leakage in the space between the core and the spring bars and also along a space between each spring bar and its adjacent keybar is eliminated by employing a plurality of baffles mounted as shown in FIG. 3 and 4 and of the particular construction illustrated in FIGS. 5, 6, 7 and 8. Referring to FIG. 3, there are shown a plurality of keybars each of which is mounted at several points along its length to a frame member 30 in the manner previously described in discussing FIG. 2. Keybars 34, each of which is supported in spaced relation with respect to frame members 30 by means of adjacent spring bars 36, are also shown in FIG. 3. To block the leakage of cooling gas from the inflowing stream to the outflowing stream, baffles 50, constructed in accordance with the present invention, are mounted on spring bars 36. Each baffle 50, as better shown in FIGS. 5–8, is U-shaped and includes two downwardly extending legs 52 and 54 and an intermediate leg 56 connecting the legs 52 and 54 at the upper ends thereof. Legs 52 and 54 engage the corresponding spring bar 36 on opposite sides thereof. Further, leg 52 extends between a spring bar 36 and its corresponding keybar 34 in such a manner as to block leakage of cooling gas along the space between the keybar and the spring bar. The intermediate leg 56 extends across the top of the spring bar 36, as viewed in FIG. 3, and fills the space between the spring bar and the adjacent spaced portion of the stator core, thereby blocking leakage of cooling gas through the space between the stator core and the spring bar 36. It will be understood that, while only three baffles are shown in the portion of the structure illustrated in FIG. 3, such baffles will be arranged between the core and each spring throughout the circumference thereof and will similarly be arranged at points along the length of the stator at any location where leakage between inflowing gas and outflowing gas would otherwise occur.

As arcuate section 58 is positioned adjacent frame member 30 between adjacent spaced spring bars 36 and a baffle 60 of U-shaped cross-section is mounted on this arcuate member in the manner providing engagement with the portion of the core adjacent thereto. This portion of the structure, illustrated in FIG. 4, however, is not part of the present invention, the present invention being directed to structure including the baffles 50.

Referring now to FIGS. 5–8, the baffle 50 is formed of a material having appropriate resiliency so as to be maintained in engagement with the adjacent portion of the stator core and thereby to block gas leakage at that region and at the same time to avoid any rigidity of connection which might increase the vibration transmission from the core to the frame. The baffle may be formed of any material having appropriate strength and resiliency but it is preferably formed of a molded polyacrylic material. In a particular embodiment of the invention the material employed is polyacrylic rubber manufactured by B.F. Goodrich Chemical Co. and sold under the trade name Hycar and designated 4021.

Each of the legs 52 and 54 is formed in cross-section to include a flat central portion 62 and flanges 64 arranged along the edges of the central portion 62 and extending outwardly therefrom. These flanges, of course, are also resilient. When in assembled position, as shown in FIG. 3, these flanges, are firmly urged against the side of the adjacent keybar 34 and thereby completely block any gas leakage through the space between spring bar 36 and keybar 34.

The intermediate leg 56 is formed with a top surface of arcuate or convex shape. The resilience of the material of which the baffle is formed maintains the intermediate leg 56 in continuous contact with the adjacent portion of the core as the core vibrates during operation of the dynamoelectric machine, thereby maintaining an effective seal. The shape of the section and the resilient characteristic of the material also insures that the intermediate leg will deflect to the needed extent as the core tends to move toward the spring bar, as it particularly tends to do at the bottom of the frame.

To provide further resilience and insure any necessary deflection of the intermediate leg 56, a passage 66 is provided extending through the leg 56.

It can be seen from the above description that an effective seal is provided at a critical area in a reverse flow cooled dynamoelectric machine so as to prevent gas leakage which would otherwise reduce the effective cooling of the stator core and at the same time to maintain effective isolation of the stator from the frame so as to minimize vibration transmission from the stator core to the frame.

While a specific embodiment for the invention has been shown and described, modifications of this structure will occur to those skilled in the art. It is not intended, therefore, that the invention be limited to the particular construction shown and described in this application and it is intended by the appended claims to cover any such modifications as come within the spirit and scope of this invention.

What is claimed is:
1. A dynamoelectric machine comprising:
   a. a frame,
   b. a plurality of circumferentially spaced spring bars adjacent said frame extending longitudinally thereof and secured to said frame at spaced points,
   c. a plurality of circumferentially spaced keybars adjacent to but spaced from said frame and extending longitudinally thereof, each of said keybars being supported by a corresponding spring bar but spaced from said spring bar along a substantial portion of its length,
   d. a stator core mounted on said keybars but spaced from said spring bars to minimize transmission of vibration from said core to said frame, said core comprising a plurality of core sections, each core section being mounted on two keybars, said core having alternate first passages for inflow of cooling gas and second passages for outflow of cooling gas, and
   e. a plurality of baffles, one baffle being positioned on each of said spring bars in each region between said first and second passages, each baffle including a portion disposed between said spring bar and said core and resiliently engaging said core to block flow of cooling gas between said core and said spring bar while minimizing transmission of vibration from said core to said frame.

2. The dynamoelectric machine of claim 1, wherein each baffle is U-shaped and includes two legs engaging opposite sides of said spring bar and an intermediate leg positioned between said core and said spring bar.

3. The dynamoelectric machine of claim 2, wherein one of said two legs is positioned between said spring bar and the corresponding keybar and closes the space therebetween to block flow of cooling gas therethrough.

4. The dynamoelectric machine of claim 2, wherein the top surface of said intermediate leg is of arcuate shape.

5. The dynamoelectric machine of claim 2, wherein said intermediate leg includes a passage extending therethrough.

6. The dynamoelectric machine of claim 2, wherein said baffle is formed of a polyacrylic material.

7. The dynamoelectric machine of claim 2, wherein each of said two legs includes, in across-section, a flat central portion and a flange at each edge of said central portion, the flanges of one of said two legs resiliently engaging the adjacent keybar.

* * * * *